United States Patent [19]

Grouse

[11] Patent Number: 4,618,806
[45] Date of Patent: Oct. 21, 1986

[54] IRONLESS, BRUSHLESS DC MOTOR WITH WAVE-WINDING

[75] Inventor: Alan Grouse, Cary, N.C.

[73] Assignee: Rotron, Inc., Woodstock, N.Y.

[21] Appl. No.: 700,670

[22] Filed: Feb. 11, 1985

[51] Int. Cl.$^4$ ............................................. H02K 29/08
[52] U.S. Cl. .................................... 318/254; 318/138; 310/68 R; 310/180; 310/254
[58] Field of Search ................... 318/138, 254 A, 254, 318/439; 310/62, 63, 68 R, 111, 207, 156, 179, 180, 254

[56] References Cited

U.S. PATENT DOCUMENTS

| | | | |
|---|---|---|---|
| 1,996,195 | 4/1935 | Ferguson | 417/356 |
| 2,472,039 | 5/1949 | Zacharias | 310/46 X |
| 2,697,986 | 12/1954 | Meagher | 417/356 |
| 3,140,434 | 7/1964 | Hetzel | 318/138 X |
| 3,230,434 | 1/1966 | Bauerlein | 318/254 A |
| 3,418,550 | 12/1968 | Kolatorowicz et al. | 318/138 |
| 3,531,672 | 9/1970 | King | 310/207 X |
| 4,011,475 | 3/1977 | Schmider | 318/254 X |
| 4,025,831 | 5/1977 | Webb | 318/254 |
| 4,093,897 | 6/1978 | Fujita et al. | 318/318 X |
| 4,256,997 | 3/1981 | Brusagline et al. | 318/254 |
| 4,371,817 | 2/1983 | Muller | 318/254 |
| 4,373,148 | 2/1983 | Gutz | 318/254 |
| 4,398,112 | 8/1983 | van Gils | 310/207 X |
| 4,459,087 | 7/1984 | Barge | 318/254 X |
| 4,553,075 | 11/1985 | Brown et al. | 318/254 |
| 4,563,622 | 1/1986 | Deavers et al. | 318/254 |

FOREIGN PATENT DOCUMENTS

| | | | |
|---|---|---|---|
| 58-89054 | 5/1983 | Japan | 310/254 |
| 1444549 | 8/1975 | United Kingdom | 310/207 |

OTHER PUBLICATIONS

Air Currents, Rotron, 1977, Describing Assignee's Trident Fan.

Primary Examiner—William M. Shoop, Jr.
Assistant Examiner—Bentsu Ro
Attorney, Agent, or Firm—Brumbaugh, Graves, Donohue & Raymond

[57] ABSTRACT

A simplified fan and brushless DC motor has a rotor with an annular permanent magnet that is magnetized in segments about its circumference and is associated with a wave-wound stator coil. Alternate circumferential segments of the magnet are oppositely polarized. Fan blades are located within the annular magnet. The wave-winding varies in position to present alternate magnetic fields opposite in direction to the rotor magnet outer surface to cause rotation thereof. The stator is ironless. The coil can have two bifilar windings alternately energized. A Hall device is, typically, employed for commutation along with suitable switching circuitry.

14 Claims, 3 Drawing Figures

IRONLESS, BRUSHLESS DC MOTOR WITH WAVE-WINDING

BACKGROUND OF THE INVENTION

This invention relates to brushless DC motors that are electronically commutated. More particularly, it relates to a wave-wound, ironless, brushless DC fan motor that is of simple construction, inexpensive to manufacture, and reliable.

A typical goal for manufacturing a fan motor is to make one that is very simple and, consequently, has a low production cost. Side armature AC motors come close to achieving these goals. Recently, however, DC fan motors have become increasingly attractive, particularly for fans used to cool electronic circuits where DC power is available.

Brushless DC motors using Hall effect devices to sense the commutation points as the rotor rotates are well known in the art. One or more stator coils are repeatedly energized or have their energization reversed to effect a relocation of the magnetic field produced by the stator coil or coils. A permanent magnet rotor is continually attracted by the new magnetic field. For commutation, one or more Hall effect devices sense the location of the poles of the permanent magnet rotor to control the energization of the stator coil or coils, or a Hall effect device detects the position of one or more commutation magnets mounted to rotate with the rotor and provided especially to indicate, by changing the state of the Hall effect device, the commutation points as the rotor turns.

Many brushless DC motors have been complex in both their structure and their commutation circuitry, with a concomitant production cost. In situations where simple, low-cost, reliable fan motors have been needed, these brushless DC motors—which might, more appropriately, have been used for precision disc or tape drives, for instance—have been too expensive for the simple purpose of fan rotation.

Commonly owned, copending U.S. Pat. No. 4,563,622 of C. Deavers and J. Reffelt, incorporated by reference herein, discloses a simple brushless DC fan motor. The motor has an annular permanent-magnet rotor that is radially magnetized (polarized) in circumferential segments. Alternate circumferential segments have opposite polarities. The motor also has a stator with an electromagnetic structure including a coil, wound on a bobbin, a core, and a pair of arms terminating in pole pieces. The electromagnetic structure is located in a compartment at one location at the bottom of a generally circular housing. A coil is energized to produce a magnetomotive force that exerts a torque for turning the rotor. A commutation circuit, which includes a position detector, preferably a Hall effect device, selectively energizes the coil. The position detector detects the position of the rotor with respect to the stator and supplies a signal for controlling the commutation circuit.

Commonly owned U.S. Pat. No. 4,553,075 of Fred Brown and Alan Grouse discloses a further brushless DC motor with an annular permanent magnet rotor magnetized in oppositely polarized segments to present alternate opposite poles to an external electromagnet structure located at one location along the circumference of the rotor. In this motor two coils are wound in bifilar fashion and are alternately oppositely energized to reverse the field presented by pole pieces in magnetic conducting relation to the coils.

The DC fan motors disclosed in U.S. Pat. Nos. 4,563,622 and 4,553,075 are simply constructed, inexpensively manufactured, and reliable. The electromagnetic structure and coil are arranged so that there is a resultant radial magnetic force on the rotor by virtue of the electromagnetic structure being located at one location along the periphery of the permanent magnet. For example, in the arrangement illustrated in FIGS. 1 and 2 of U.S. Pat. No. 4,563,622, when the stator coil is energized, the magnetic field created produces a radial forces directed towards the stator magnetic pole pieces at one side of the rotor. When the stator coil is deenergized, these radial forces are removed. The resultant of these radial forces is a radial force in one radial direction each time the stator coil is energized. For very quiet operation, free of vibration, and having less demanding bearing requirements, it would be desirable to provide the counterbalancing or more nearly counterbalancing radial forces that multiple coils located about the entire periphery of a rotor can provide while still providing many of substantial benefits of the simple, inexpensive and reliable motor of the aforesaid application. In that case, in the design and manufacture of the motor, attention to vibration due to repeated radial forces on the rotor could be substantially reduced.

SUMMARY OF THE INVENTION

In accordance with this invention, a simple DC brushless motor has a rotor with an annular permanent magnet and a wave-wound stator. The annular magnet is a relatively large ring magnetized in segments or sectors about its circumference. Each succeeding segment is oppositely polarized. The wave winding can encircle the ring, presenting alternating magnetic fields to the outer surface of the magnet across an air gap.

One or more wave-windings are distributed around the rotational path of the annular magnet in a wave like pattern that varies the location of the winding axially as one proceeds around the rotor magnet. That is to say, the wave of the winding proceeds from a location closer the front of the motor at one point on the stator to a location closer to the back of the motor at another point and continues forward and back until the rotor has been encircled. When energized, the winding's plurality of field locations acting on the annular magnet at a plurality of locations around the magnet produce offsetting magnetic forces to diminish or eliminate the resultant radial force on the rotor. Vibration from the repetitive radial force resultant can thus be totally or substantially eliminated. This manner of winding takes up very little space in the radial direction so that this motor can be quite compact. Bearing demands are not as great and the likelihood of noise is greatly diminished.

In the fan of this invention, as with those of the above-mentioned applications, fan blades are located within and affixed to the annular magnet. The magnet and the fan blades are mounted for rotation on a central hub. The stator includes a housing and support structure extending from proximate the magnet to the hub; this structure supports the rotor, including the hub, the fan blades and the magnet, for rotation. A Hall device can be used to control commutation. A small compartment in the housing may be provided to hold commutation circuitry or that may be remotely located.

The wave-winding is wound on cylindrical stator structure surrounding the permanent magnet. It is supported closely proximate and just radially outward of the annular rotor magnet. Two coils can be wave wound in bifilar fashion and oppositely energized to present alternating fields attracting succeeding oppositely magnetized segments of the annular permanent magnet of the rotor during operation.

The stator of the subject motor is ironless, which is to say that there is no high permeability or magnetic materials directing flux to stator poles. The motor can thus be light weight, and because there are no salient poles of magnetic material, there is no attraction of the rotor magnet to a cog position as the rotor comes to rest.

The above and further features of the invention will be better understood with reference to the several figures of the attached drawings and the following detailed description of the preferred embodiments.

DETAILED DESCRIPTION OF THE PREFERRED EMBODIMENTS

Figure 1:
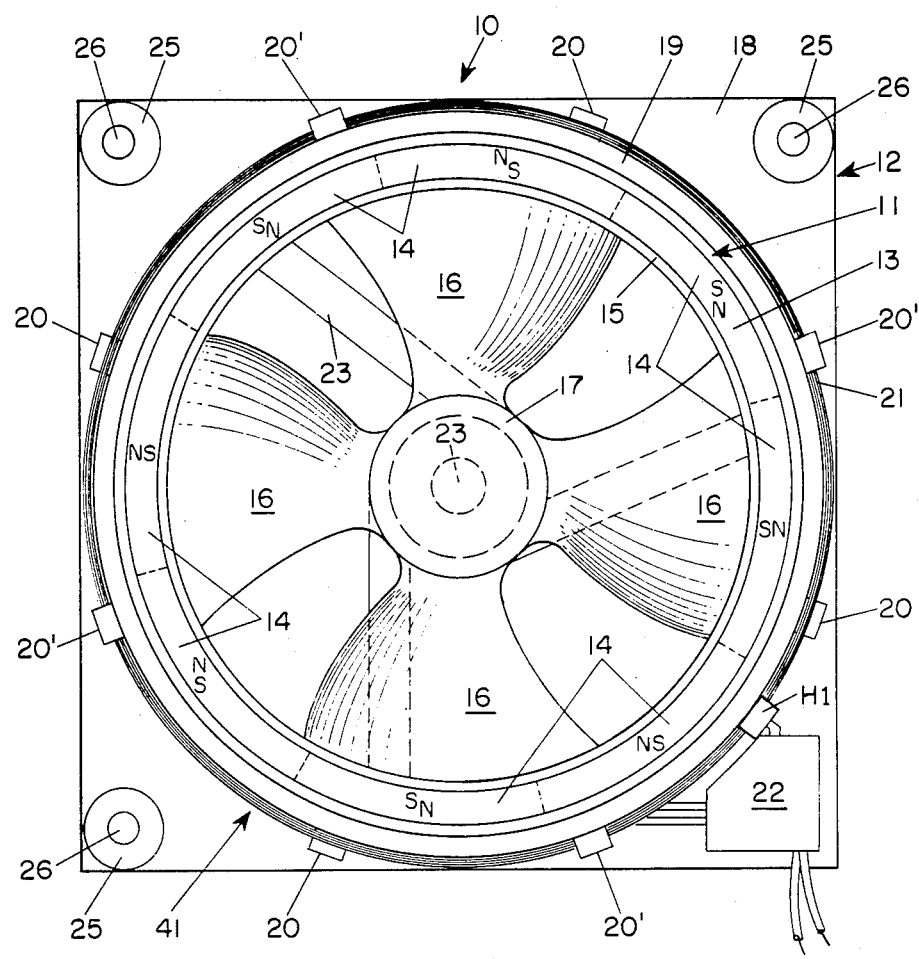
FIG. 1 is a top plan view of a fan and motor according to this invention with a rotor having alternately radially magnetized segments and a stator having wave-wound stator coils.
Figure 2:
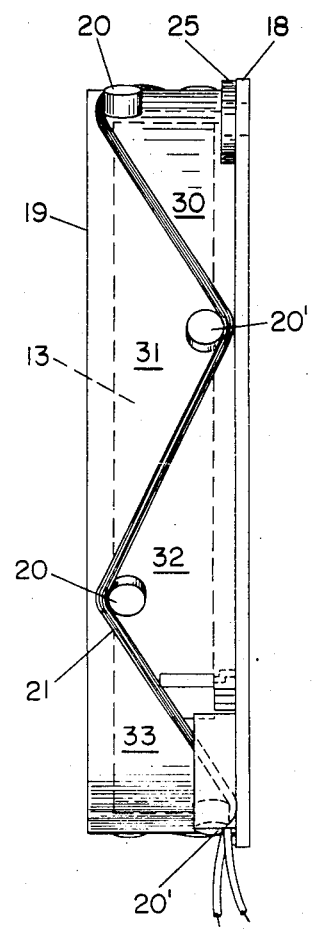
FIG. 2 is a side elevational view of the fan and motor shown in FIG. 1 and better illustrates the wave wound coils.

In FIGS. 1 and 2, a fan and motor combination 10 according to the invention includes a rotor 11 and a stator 12. The rotor 11 has an annular permanent magnet 13 magnetized in eight segments 14 about its circumference; each alternate segment 14 is oppositely polarized in the radial direction, as shown by the north (N) and south (S) magnetic pole designations. The annular magnet 13 is secured on a ring 15. Fan blades 16 extend from the ring 15 to a central hub 17. U.S. Pat. No. 4,563,622 provides details for one possible mounting and support arrangement for the rotor 11 (including the hub 17); the mounting and support arrangement employed is not an essential feature of this invention.

The stator 12 includes a base 18, which, as shown, has a substantially rectangular shape, but may have other shapes, such as circular. The base 18 supports a substantially cylindrical member or wall 19 having lugs 20 and 20', farther from and closer to the base 18, respectively, and projecting radially outward. A coil 21 is wound onto the lugs 20 and 20'. As illustrated, the winding wire is alternately wound over one lug and under the next, with this pattern being repeated to form the wave shape of the coil. The crests and valley of the wave vary axially in position, with respect to the axis of the rotor's rotation. FIGS. 1 and 2 show the coil waveshape as a triangle wave. As seen in FIG. 2, the bifilar winding surrounds the rotor in a zig-zag pattern of successive substantially straight segments, each of which has both a circumferential component of about ⅛th the total circumference and an axial component of about the width of the rotor along the axis, the axial component of successive segments alternating in direction. In addition to the lugs shown, the wave-shape of the coil 21 may be formed in other ways such as by winding the turns of wire in a channel, groove or other support structure in or on the wall 19. The coil 21 comprises two bifilar-wound windings L1 and L2 (FIG. 3), each separately energizeable in opposite directions by a commutation circuit 22. When current flows through one of the windings L1 or L2, alternate north and south magnetic poles, eight poles altogether, are produced around the circumference of the rotor. Current through the other of the coils in the opposite direction produces fields of the opposite polarity. As will be discussed below, in relation to the circuit of FIG. 3, the current is controlled by a Hall switch H1 of the commutation circuit 22 to produce poles correctly timed to exert torque on the annular magnet 13 and, consequently, turn the rotor 11. In FIGS. 1 and 2, the Hall switch H1 is shown mounted upon the exterior of the cylindrical wall 19.

The stator 12 further includes struts 23 radiating outwardly from a central stator projection 23 to the base 18. Mounting bosses 25 define holes 26, which enable the motor and fan combination 10 to be mounted by, for instance, bolts or screws (not shown) passed through the holes 26.

An exemplary embodiment of a circuit 22, suitable to control the motor, is shown in U.S. Pat. No. 4,563,622 and is reproduced in FIG. 3. Other suitable circuits are known and disclosed in the patent literature.

At start-up, the coil 21 is energized to apply starting torque to the annular magnet. The Hall effect device H1 controls energization of the coil 21 such that the coil windings L1 and L2 are alternately energized to attract approaching poles of the annular rotor magnet. When the Hall effect device H1 detects changing of the magnetic field produced by the rotor 11 due to the arrival of a new, oppositely magnetically polarized segment proximate the device, the magnetic field at the annular permanent magnet is reversed by means of the circuit of FIG. 3 to attract the poles of the annular rotor magnet next approaching. This sequence repeats itself until the rotor comes to an equilibrium speed where the aerodynamic load balances the motor power.

In FIG. 2, the poles produced by the wave-winding are produced in the areas 30, 31, 32 and 33 below and above the windings alternately and continuing around the rotor. Consideration of the path and direction of the lines of flux produced around a conductor will indicate that each succeeding area's field is opposite in direction from the preceding area and reversal of the current flow will reverse the field in each area. Moreover, it will be seen that each area in which a field is produced exerting a radial attraction on the magnet 13 has an area exactly 180° away exerting a like radial force in the opposite direction such that these counter-balance to cancel repeated radial forces tending to produce vibration and noise. The stator windings may be wound to provide fewer or more pole areas and the rotor magnet may likewise have fewer or more oppositely polarized segments. In each case, the best location for the Hall device H1 is easily empirically determined such that switching occurs just as new segments move into position to be attracted to a new stator field area.

Figure 3:
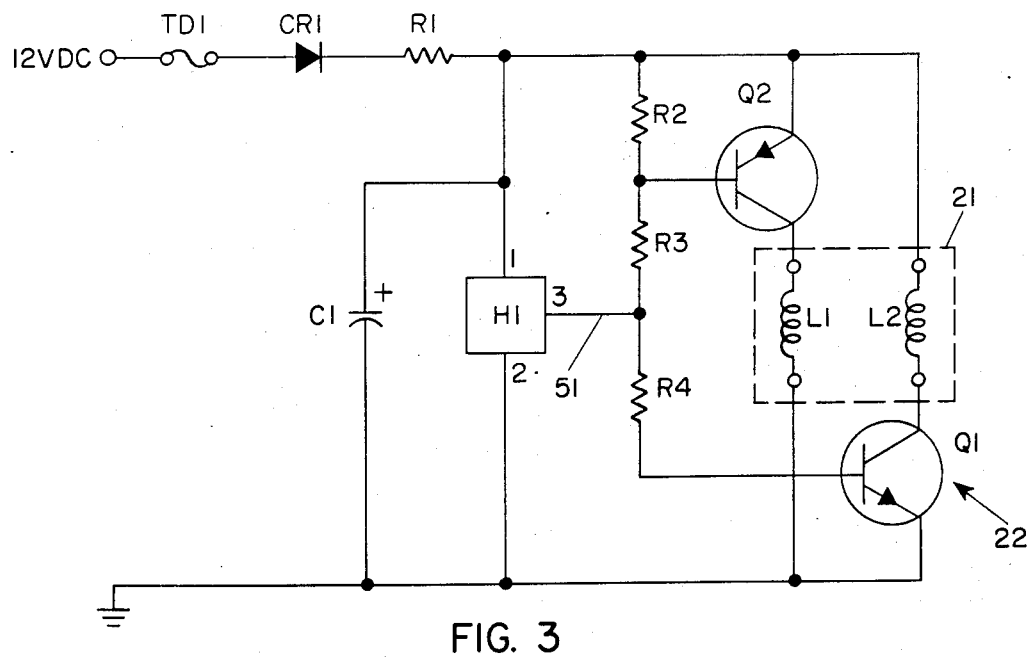
FIG. 3 is a diagramatic illustration of a detector and commutation circuit suitable to operate the rotor of FIGS. 1 and 2.

In FIG. 3, the Hall device H1, which can be a Hall switch, for example, is seen controlling transistors Q1 and Q2, each of whose collector-emitter circuits is in series with a different one of coil windings L1 and L2. One such Hall switch which may be used is the Hall effect digital switch UGN-3013T of Sprague Electric Co., Worcester, Mass. Exposure of the Hall effect device H1 to a magnetic field of one direction or polarity opens (breaks) a conduction path from a line 51 (pin 3) to ground (pin 2), while exposure of the device H1 to an opposite polarity closes (makes) a conduction path from line 51 to ground.

When the path is open, there is very little voltage drop across resistors R2, R3 and R4, and the Q1 base-emitter voltage is sufficient to turn on Q1, which is an NPN Darlington pair, commonly housed and sold as a single component. The Q1 Darlington pair has a high gain so that the small base current through R2, R3 and R4 is adequate to turn on Q1 and energize the winding L2. When the path through H1 is open, the Q2 base-emitter voltage is insufficient to turn on Q2, a PNP power transistor that requires a greater base drive to conduct. So with Q2 off, no current flows through winding L1. When the Hall effect device H1 experiences a magnetic field of opposite direction or polarity, connecting line 51 to ground, a voltage drop nearly equal to the full input voltage, for example about 12 volts, appears across resistors R2 and R3, creating a Q2 base-emitter voltage sufficient to turn on Q2. Conduction by Q2 causes current to flow through winding L1. However, the Q1 base-emitter voltage is insufficient to turn Q1 on, so that no current flows through winding L2. Windings L1 and L2 are thus alternatively energized and deenergized in response to detection of different magnetic fields by Hall device H1. Instead of providing two separate coil windings L1 and L2, only one winding may be provided along with circuit means to alternately reverse the current in the winding.

The remainder of the FIG. 3 circuit comprises capacitor C1, which damps transients that arise from the abrupt switching of the coil 21, a current limiting resistor R1, appropriate protective fusing such as fuse TD1, and diode CR1, which prevents current reversals back through the input leads to the supply. The circuit elements may be mounted on a printed circuit board of essentially the same shape as a cavity that forms a compartment (not shown) in the base 18 or the circuit 22 may be remotely located.

From the foregoing it will be seen that a simplified brushless DC motor is provided in which the field producing provisions of the stator, such as the windings 21, add very little to the radial dimension. In a fan, a large proportion of the motor's radial dimension can be dedicated to the air moving structure. The stator's radial dimension, e.g., the radial thickness of the cylindrical wall 19, and coil 21, and the lugs 20 and 20' is no greater than the thickness in the radial direction of the ring 15 and magnet 13. So in this case, where an objective is to provide a large central opening surrounded by relatively narrow structure, this strator arrangement is particularly satisfactory even though the coil surrounds the narrow annular magnet. It will be readily apparent to those skilled in the art that many variations in the foregoing exemplary, preferred embodiments can be made without departing from the spirit and scope of the invention, as defined in the appended claims.

I claim:

1. A DC motor comprising:
    a rotor with an annular permanent magnet defining a large central opening and magnetic segments wherein segments of like polarization are spaced apart circumferentially about the annular magnet;
    an ironless stator with coil means having at least one wave-shaped bifilar wire winding, the winding being wound proximate the rotational path of the annular magnet thereof and varying axially in position to define areas of oppositely directed electromagnetic fields at the magnet when energized with a direct current;
    position detecting means for detecting the position of the rotor relative to the stator; and
    means responsive to the position detecting means for controlling the supply of electrical current to the winding to repeatedly produce the oppositely directed fields and apply rotational torque to the magnet.

2. The motor according to claim 1 wherein the wave-shaped winding is outside the magnet and comprises a bifilar winding which surrounds the rotor in a zig-zag pattern of successive substantially straight segments, each of which includes both a circumferential component and an axial component, the axial component of successive segments alternating in direction.

3. The motor according to claim 2, wherein said position detecting means include means for detecting the position of the magnetic segments with respect to the areas of oppositely directed electromagnetic fields and the means responsive to the detecting means comprises means for energizing the winding to produce fields that will exert only a rotational torque on the magnet to cause rotation of the rotor, the radial fields producing substantially no net radial force on the rotor.

4. The motor according to claim 1, wherein the coil means includes two wave-shaped windings, each varying in axial position with respect to the magnet to form the wave-shape and to define the areas of oppositely directed fields around the outer periphery of the magnet, said means responsive to the position detecting means comprising means for alternately energizing the windings.

5. The motor according to claim 4, wherein the succeeding magnet segments along the magnet in the circumferential direction are oppositely radially polarized.

6. The motor according to claim 5, wherein diametrically opposite positions of the wave-winding produce oppositely directed radial forces upon the rotor when the winding is energized.

7. The motor according to claim 1, wherein the annular magnet is a narrow ring having an internal diameter at least twice the radial thickness of the ring.

8. The motor according to claim 1, wherein the segments are radially polarized and the coil means are in the form of an axially oscillating wave.

9. The motor according to claim 8, wherein the stator includes a housing defining a wall on the periphery of the rotational path of the annular magnet, said coil means being in the form of an axially oscillating wave along said wall.

10. The motor according to claim 1, further comprising fan blades supported internally of the annular magnet and connected therewith.

11. The motor according to claim 10, wherein the fan blades extend from proximate the inside surface of the annular magnet to a central hub, said stator including a central member supporting, for rotation, the hub, the blades, and the rotor members, including the annular magnet, said stator further including struts extending outwardly from the central stator member to a housing supporting the coil means proximate the rotational path of the annular magnet said wave-shaped winding of the coil means circumferentially encircling the annular magnet.

12. A fan and motor combination including an annular permanent magnet having a relatively large central opening therethrough and magnetized segments, wherein succeeding segments of like polarity are circumferentially spaced apart, fan blades secured to the magnet internally thereof in the central opening, wave-shaped coil means surrounding the magnet and supported proximate the magnet on a cylindrical support surface encircling the magnet to produce areas of oppositely directed electromagnetic fields proximate the magnet, detection means responsive to the position of the annular magnet segments, and means responsive to the detection means to repeatedly energize the coil means to exert a rotational torque on the annular magnet.

13. The fan and motor combination according to claim 12, wherein the segments are radially polarized and the coil means are in the form of a wave axially varying in position at locations proceeding around the magnet, the cylindrical support surface and the coil means supported therein being radially narrower than the magnet and of relatively small radial thickness in comparison to the radial extent of the fan blades; whereby the support surface and coil means contribute little to the radial dimension of a fan thus formed.

14. A DC motor comprising a rotor with an annular permanent magnet defining a large central opening and magnetic segments radially polarized, wherein segments of like polarization are spaced apart circumferentially about the annular magnet; an ironless stator with coil means wherein the stator includes a housing defining a wall on the periphery of the rotational path of the annular magnet; and lugs spaced apart circumferentially about said wall; and said coil means is in the form of an axially oscillating wave along said wall with the windings of the coil means supported on said lugs.

* * * * *